United States Patent
Duncan et al.

(10) Patent No.: US 6,546,692 B1
(45) Date of Patent: Apr. 15, 2003

(54) METHOD OF MOUNTING AN INSULATED IMPACT RESISTANT GLASS COMPOSITE IN A WINDOW FRAME

(75) Inventors: Craig Duncan, Hudson, FL (US); James E. Mazzeo, Jr., Tampa, FL (US)

(73) Assignee: Film Technologies International, Inc., St. Petersburg, FL (US)

( * ) Notice: Subject to any disclaimer, the term of this patent is extended or adjusted under 35 U.S.C. 154(b) by 16 days.

(21) Appl. No.: 09/969,908

(22) Filed: Oct. 3, 2001

(51) Int. Cl.$^7$ ................................................ E04C 2/00
(52) U.S. Cl. .................. 52/786.11; 52/786.13; 52/788
(58) Field of Search ................ 52/786.13, 786.11, 52/790, 788, 659.9, 656.9; 428/34

(56) References Cited

U.S. PATENT DOCUMENTS

| | | | |
|---|---|---|---|
| 2,167,772 A | | 8/1939 | Owen |
| 3,553,913 A | | 1/1971 | Eisenberg |
| 4,011,356 A | * | 3/1977 | Lambert et al. ............... 428/34 |
| 4,542,611 A | | 9/1985 | Day |
| 4,822,649 A | | 4/1989 | Canaud et al. |
| 5,061,531 A | | 10/1991 | Catalano |
| 5,128,181 A | * | 7/1992 | Kunert ........................... 428/34 |
| 5,156,894 A | | 10/1992 | Hood et al. |
| 5,269,108 A | | 12/1993 | Fremaux |
| 5,308,662 A | | 5/1994 | Woodard et al. |
| 5,313,761 A | | 5/1994 | Leopold |
| 5,345,743 A | | 9/1994 | Baier |
| 5,363,611 A | * | 11/1994 | Richardson et al. ......... 312/116 |
| 5,496,640 A | * | 3/1996 | Bolton et al. ................ 428/421 |
| 5,506,051 A | * | 4/1996 | Levy-Borochov et al. .. 428/332 |
| 5,637,363 A | * | 6/1997 | Leray et al. .................... 428/34 |
| 5,683,764 A | | 11/1997 | Alts |
| 5,714,214 A | | 2/1998 | Larsen |
| 5,778,629 A | * | 7/1998 | Howes ...................... 52/786.11 |
| 5,784,853 A | * | 7/1998 | Hood et al. ............... 52/786.13 |
| 5,878,538 A | | 3/1999 | Rossini |
| 5,932,329 A | * | 8/1999 | Frost et al. ................... 428/214 |
| 5,960,606 A | * | 10/1999 | Dlubak ..................... 52/786.11 |
| 5,983,593 A | * | 11/1999 | Carbary et al. ........... 52/786.11 |
| 6,001,487 A | * | 12/1999 | Ladang et al. .............. 428/432 |
| 6,042,924 A | * | 3/2000 | Paulus et al. ................. 428/77 |
| 6,237,306 B1 | * | 5/2001 | Dlubak ..................... 52/786.11 |
| 6,261,398 B1 | * | 7/2001 | Costa .......................... 156/102 |
| 6,266,940 B1 | * | 7/2001 | Reichert .................... 52/786.13 |
| 6,276,100 B1 | * | 8/2001 | Woll et al. ................ 52/204.62 |
| 6,391,400 B1 | * | 5/2002 | Russell et al. ................ 428/34 |

* cited by examiner

*Primary Examiner*—Jeanette Chapman
(74) *Attorney, Agent, or Firm*—Larson & Larson, PA; James E. Larson

(57) ABSTRACT

Two window panes are each laminated on one side with polyethylene terephthalate film. The film sides are faced towards each other and a spacer of ¼ to ⁹⁄₁₀ inch width is placed between the coated surfaces of the window panes. An inboard surface of the spacer is positioned level with a top of the framing system. The area between an outside edge of the spacer and the edge of the window panes is backfilled with silicone sealant. The formed composite is then secured in a glazing channel on the window frame with silicone applied in the glazing channel of the window frame.

14 Claims, 7 Drawing Sheets

METHOD OF MOUNTING AN INSULATED IMPACT RESISTANT GLASS COMPOSITE IN A WINDOW FRAME

BACKGROUND OF THE INVENTION

This invention relates to insulated window panes. More particularly, it refers to a method of forming two or more impact resistant laminated insulating window panes and mounting them in a window frame.

DESCRIPTION OF THE PRIOR ART

Although multiple glazed insulating glass mounted in a frame is well known as shown in U.S. Pat. Nos. 3,553,913; 4,542,611; 4,822,649; 5,156,894; 5,269,108 and 5,878,538. Such patents do not describe making impact resistant window panes and mounting them in a frame. Insulating glass having substantial structural resistance to wind loading stresses is described in U.S. Pat. No. 5,714,214. Glass resistant to impact from large missiles, as described in the South Florida Building Code, is not described in this patent.

Recently, local building codes have specified the need for impact resistant glass, the glass to withstand up to nine pounds of force from a 2×4 board shot at the glass at up to 50 feet/second. The prior art does not provide a method for mounting such impact resistant glass in a window frame.

SUMMARY OF THE INVENTION

The method of this invention balances large missile impact resistance and thermal efficiency in a window system. A pair of impact resistant glass panes in a customary dry-lamination process are formed by coating the glass with a plurality of plies of safety film laminated together. A spacer is positioned to separate each coated glass pane. A top or inboard surface of the spacer is positioned level with a top of the window frame along a site line. An area from the bottom or outboard portion of the spacer to an edge of the glass is back-filled with silicone sealant or buytal. The spacer is ¼ to ¾ inch in width between the glass panes. The resulting impact resistant two window pane composite is secured into a glazing channel on a window frame with silicone applied in the glazing channel between an inner surface of the window frame and a surface of the window glass panes opposite the coated surface.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Throughout the following detailed description, the same reference numbers refer to the same element in all figures.

Figure 1:
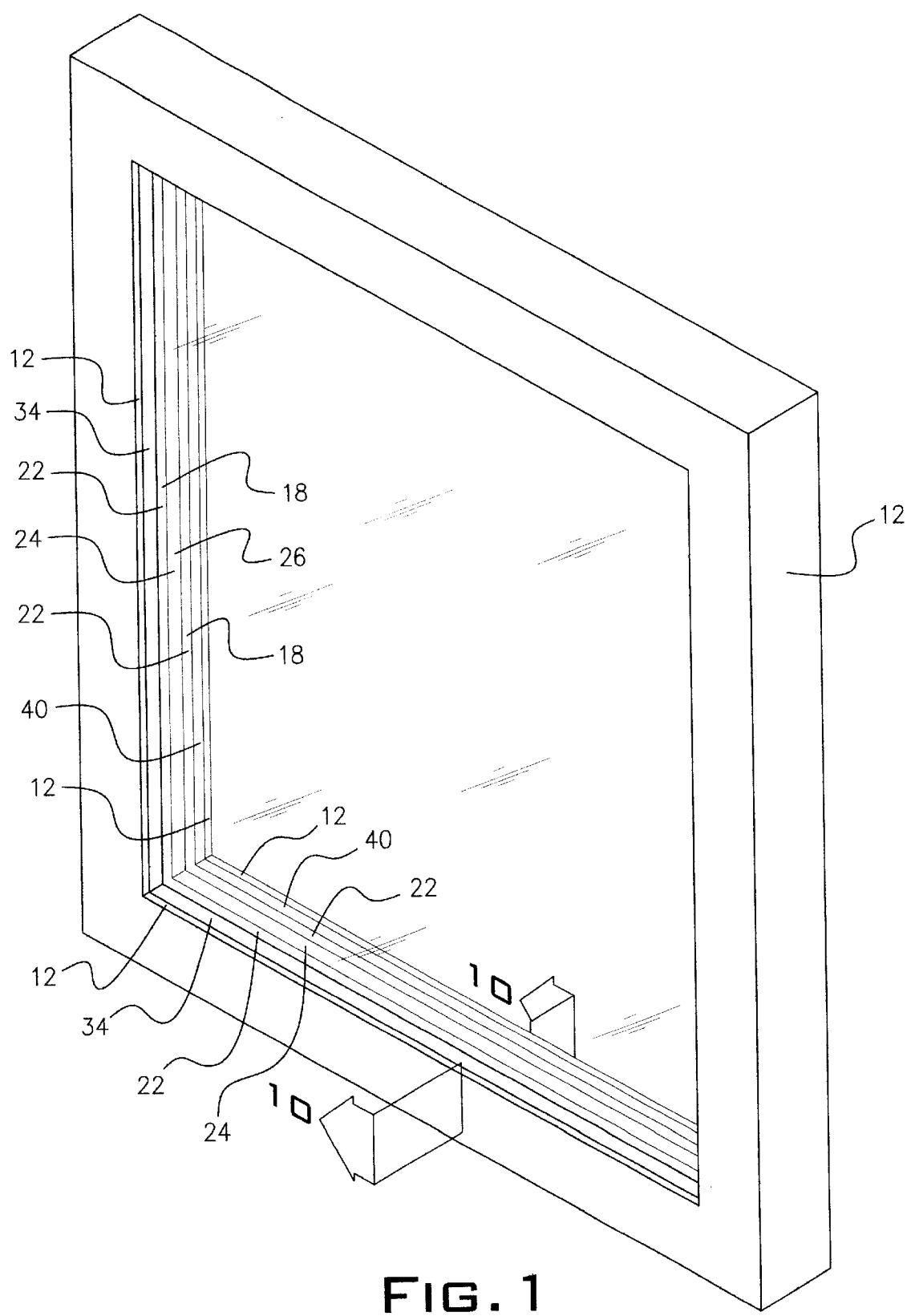
FIG. 1 is a front elevational perspective view of a window frame assembly made in accordance with the method of this invention.
Figure 10:
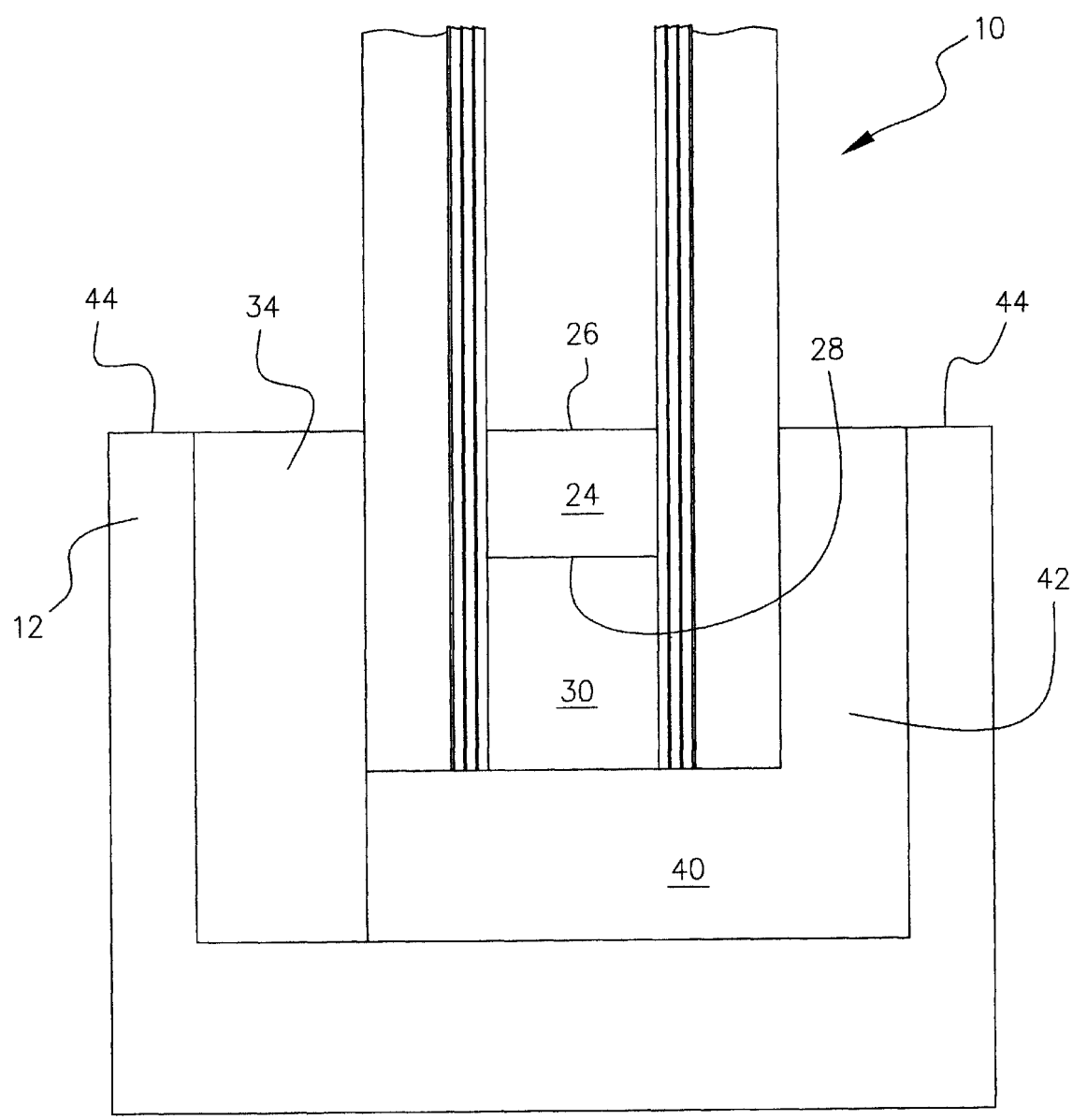
FIG. 10 is a sectional view along line 10—10 of FIG. 1 showing the window composite mounted in the window frame.

Referring to FIGS. 1 and 10, the method of this invention makes a multiple window pane composite 10 securely mounted within a window frame 12 to create an insulated impact-resistant window. Such an impact-resistant window can withstand a nine pound force of a 2×4 wooden post striking the glass at a speed of 50 feet/second, and cyclic load as described by the South Florida Building Code.

Figure 2:
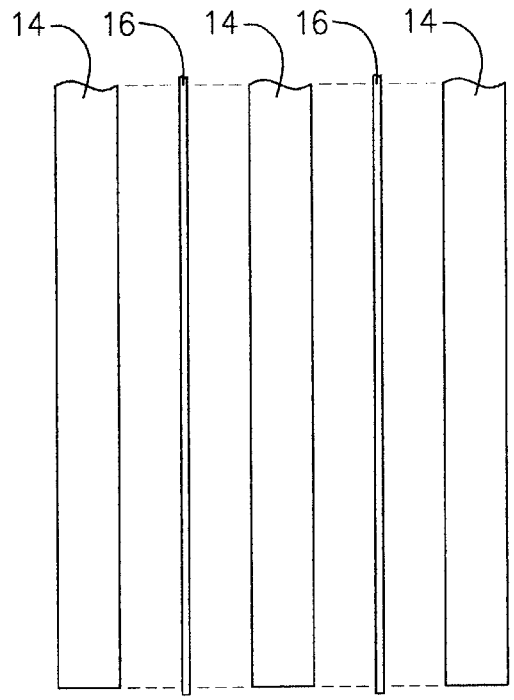
FIG. 2 is an exaggerated side view of a three ply safety film being laminated together.
Figure 3:
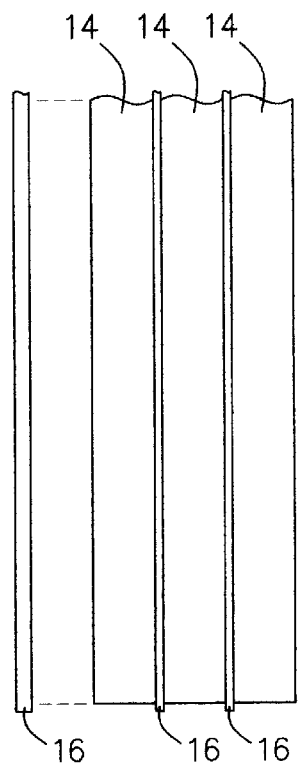
FIG. 3 is an exaggerated side view of the safety film of FIG. 2 laminated together.
Figure 4:
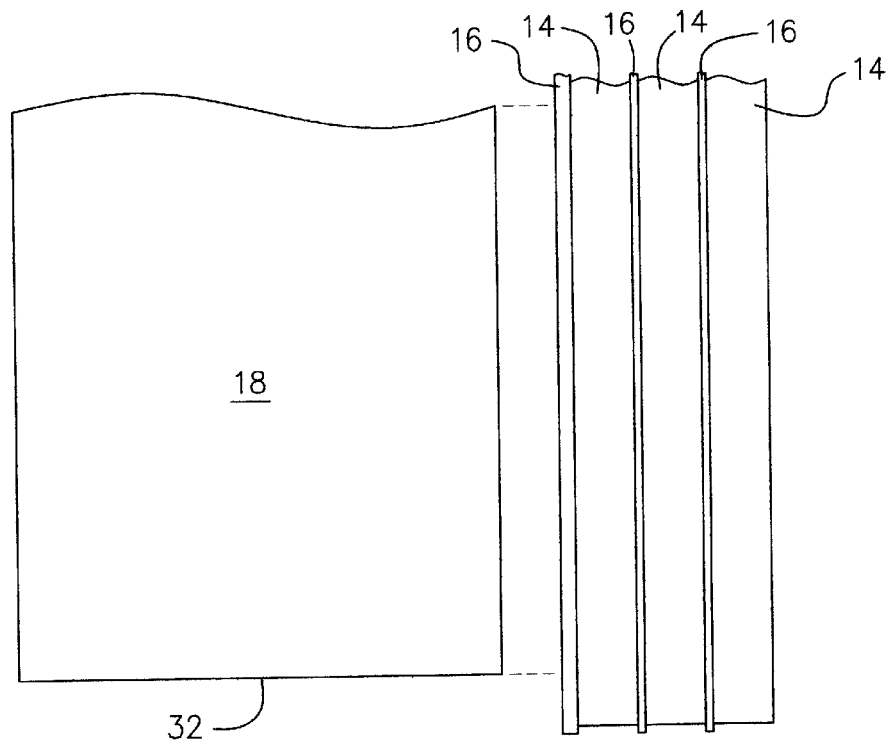
FIG. 4 is an exaggerated side view of the safety film being coated on a window pane.

Referring to FIGS. 2–3, three plies 14 of 4 mm polyethylene terephthalate film (PET) are laminated together with an acrylic pressure sensitive adhesive 16 to form a polyethylene terephthalate film thickness 20 of approximately twelve mils. Such a laminate is classified as a safety film and is used to coat a window pane 18 shown in FIGS. 4–5. Other safety films which can be used include single or multiple films, ranging from about 8 mil to 25 mil. These films can be made of PET, polycarbonate or other like plastic materials. The laminated film thickness 20 is laminated to only one surface of the glass window pane 18. The laminated film thickness 20 is applied over edge 32 of the glass 18 and is then cut off even with edge 32.

Figure 5:
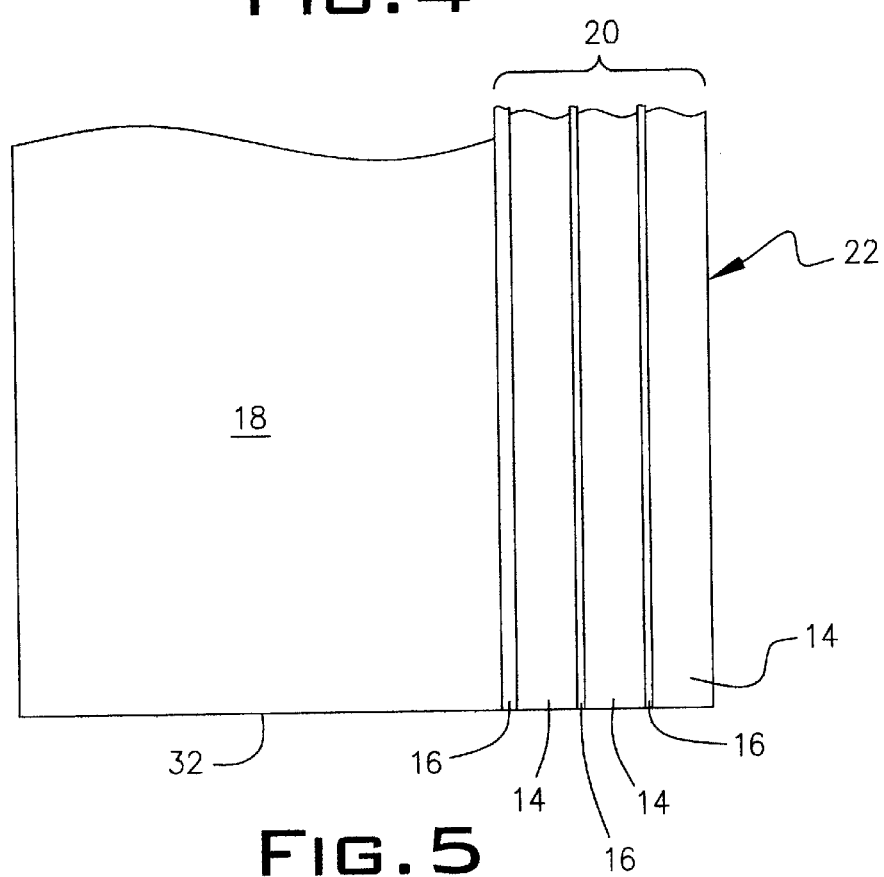
FIG. 5 is an exaggerated side view of the safety film coated on a surface of the window pane.
Figure 6:
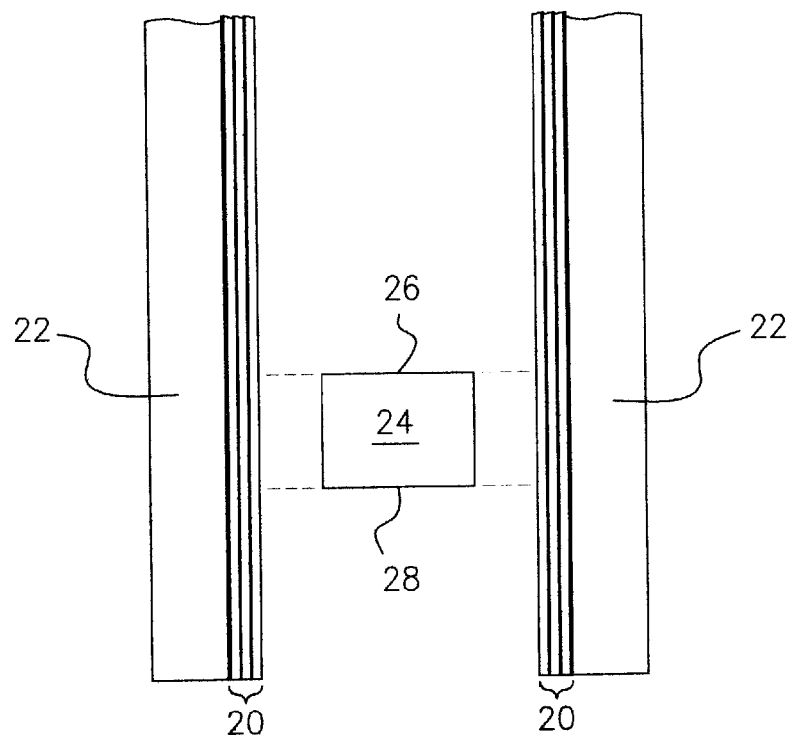
FIG. 6 is a side view in section of a spacer being mounted between two coated window panes.
Figure 7:
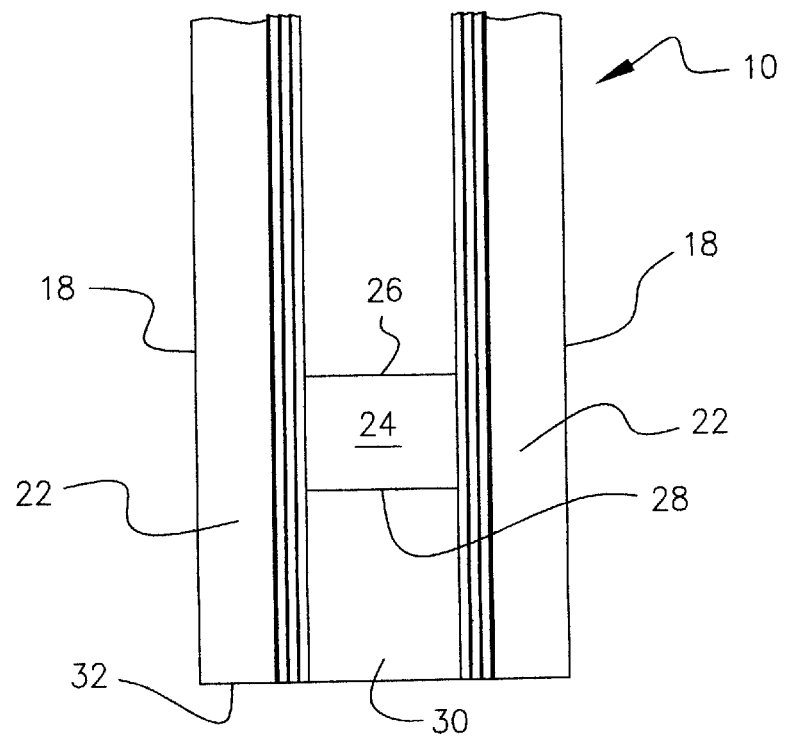
FIG. 7 is a side view in section of the spacer mounted between two window panes.

Two of the laminated window panes 22 shown in FIG. 5 are faced to each other and a spacer 24 shown in FIGS. 6 and 7, having a top inboard surface 26 and a bottom outboard surface 28 is placed between the laminated surfaces of the two window panes 22 and pressed together to form a multiple window pane composite 10 shown in FIG. 7. A structural silicone or buytal 30 is backfilled from the outboard surface 28 of the spacer 24 to the edge 32 of the laminated window pane 22.

The spacer employed should have a thickness sufficient so its outboard surface 28 extends to about ¼ inch from the window pane edge 32 and its inboard surface is on the site line 44 of the window frame 12. The width of the spacer between the laminated window panes 22 should be ¼ to ⁹⁄₁₆ inch with ¼ to ½ inch being preferred. Edge Tech's "super spacer" or Tru Seal's "swiggle" are preferred spacers 24.

Figure 8:
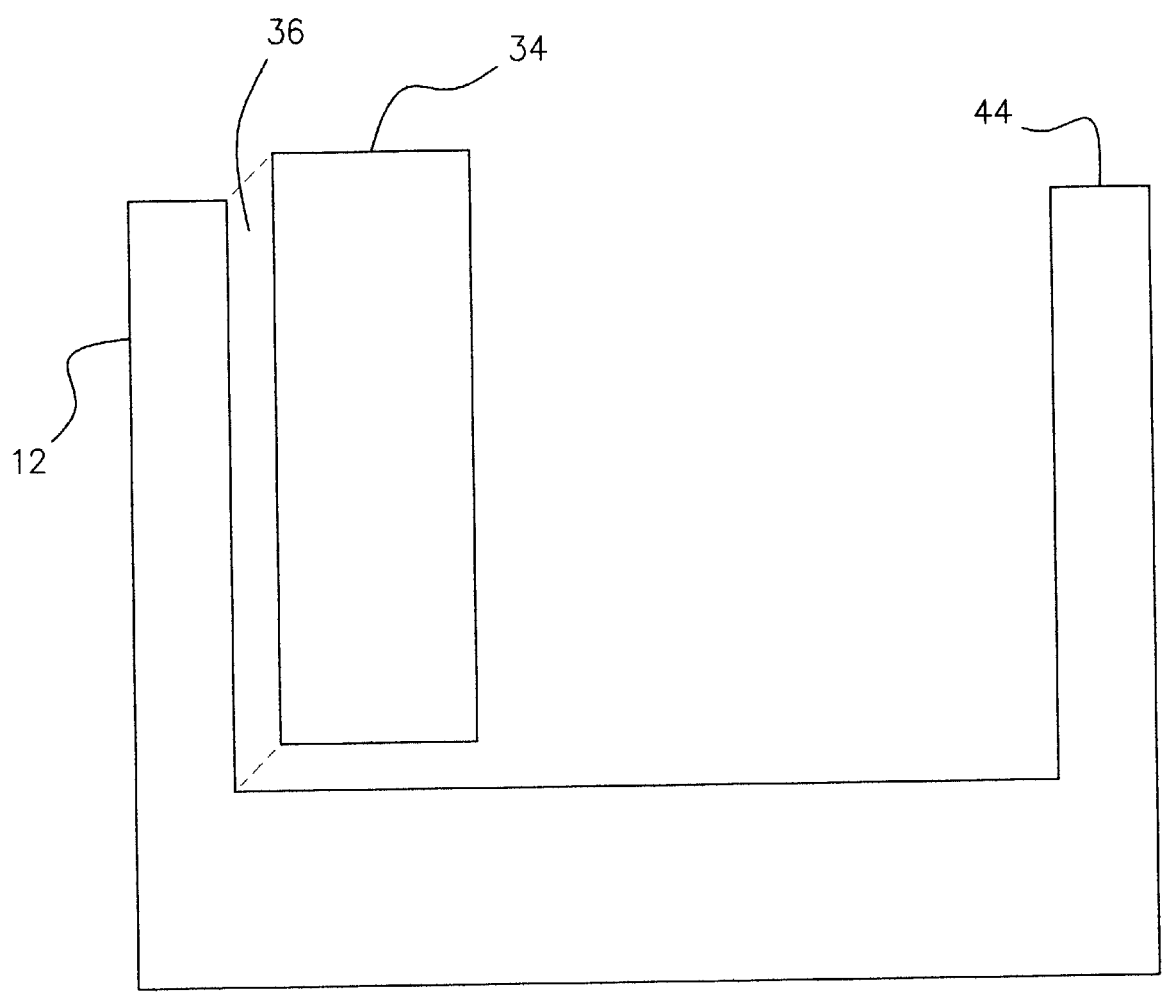
FIG. 8 is a side view in section of a frame member with a silicone tape being affixed to the frame member's glazing channel.
Figure 9:
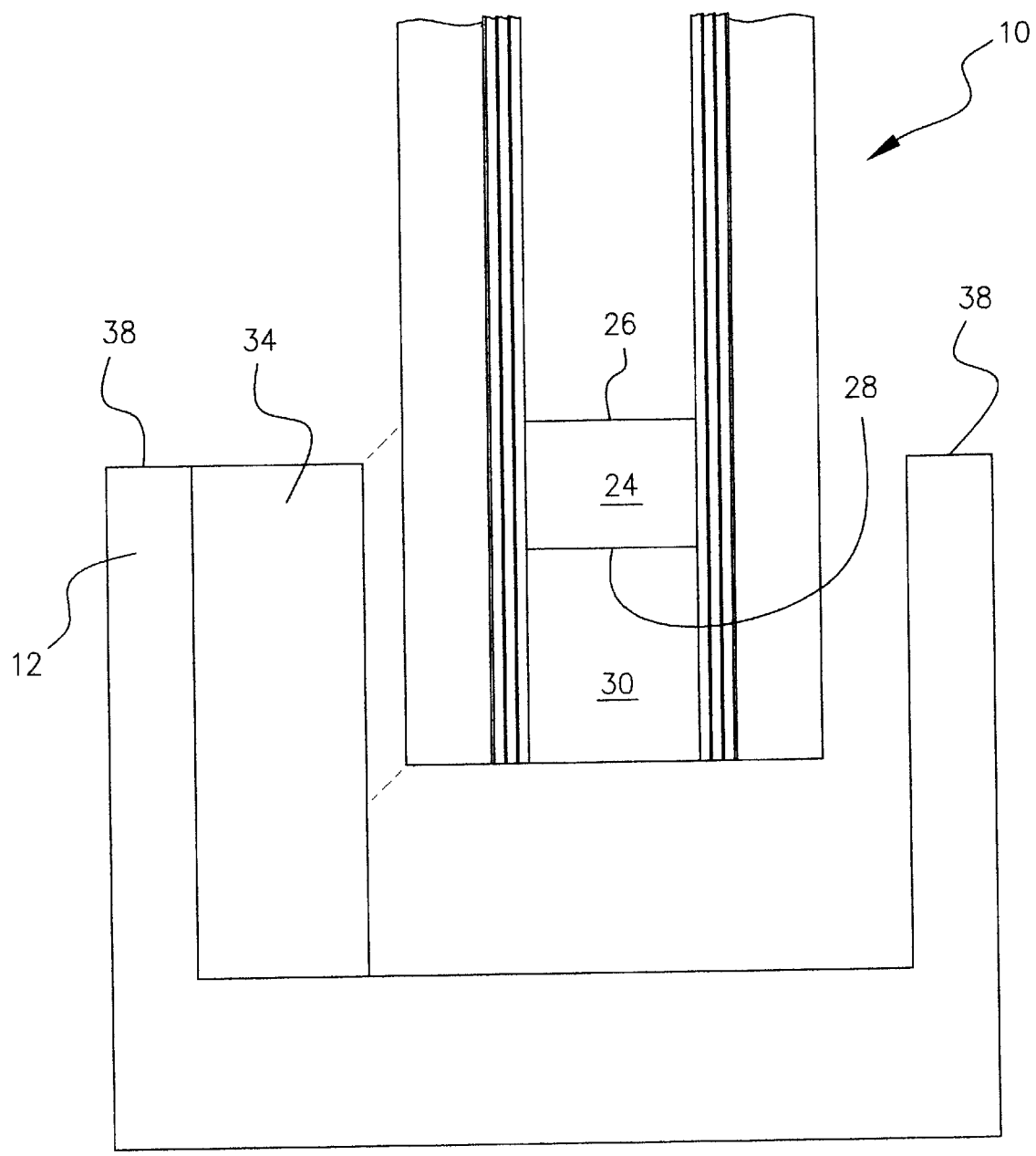
FIG. 9 is a side view in section of a two pane window composite being mounted in a window frame.

A foam silicone tape 34 is then placed around the glazing channel 36 in window frame 12 as shown in FIG. 8. As shown in FIG. 9, the multiple window frame composite 10 is then placed in the glazing channel 36 to abut the foam tape 34 and fixed in a manner so that the top inboard surface 26 of the spacer 24 is level with the top 38 of the window frame 12. This is called the site line 44. Additional silicone 40 is then backfilled around the multiple window pane composite 10 so that the silicone fills in the bite 42 of the frame 12. Thereafter, a snap in glazing bead well known in the prior art is inserted and any gaps between the glazing bead and the window pane composite 10 is filled with structural silicone 40 up to the site line 44 of the window frame 12.

Buytal can be substituted for the silicone 30 or 40 as can other like substances which find use in the glazing art. Dow Corning 995 structural silicone is preferred as backfill.

The silicone foam tape 34 should be about ⅛ to ¼ inch thick and extend from the site line 44 to the bottom of glazing channel 36. It should be positioned between an inner wall of the window frame 12 and a non-coated surface of a window pane 18 as seen in FIG. 9.

The bite 42 of the window into the frame should be between ½ and 1 inch with ⅞ inch being preferred.

The minimum glass pane 18 thickness will vary depending on the area of use wind load chart and building codes. About ⅜ inch glass is suitable in most areas with a laminated film surface thickness of 0.008 to 0.020 inch. Three plies amounting to 0.012 inch is preferred.

The above description has described specific steps and materials to form an insulated high impact resistant composite mounted in a window frame. However, it will be within the knowledge of one having ordinary skill in the art to make modifications without departing from the spirit and scope of the underlying inventive steps. The inventive concept for the steps employed are not limited to the materials employed but include modification and equivalence as would normally be employed.

Having thus described the invention what is claimed and desired to be secured by Letters Patent is:

1. A method of forming and mounting an insulated impact-resistant glass composite into a window frame, the steps comprising:

coating one side surface of two window panes having a predetermined thickness with a laminated safety film extending to all edges of the window panes;

facing the side of the window panes containing the laminated safety film towards each other while inserting a ¼ to ⁹⁄₁₆ inch wide spacer inboard from the edges of the window panes between the laminated surface of the window panes while providing an inboard edge of the spacer in a site line with the window frame;

backfilling a structural silicone from an outboard edge of the spacer to the edges of the window panes to form a two window pane composite;

placing a silicone tape or silicone composition in a glazing channel of the window frame below the sight line of the window frame;

inserting the window pane composite in the glazing channel of the window frame while maintaining the silicone tape or silicone composition between an inside surface of the window frame and the surface of the window pane composite opposite the coated surface; and installing a snap in glazing bead together with filling any gap between the glazing bead and the window pane composite with structural silicone up to the site line of the window frame.

2. The method according to claim 1 wherein the laminated safety film is provided as a polyethylene terephthalate film.

3. The method according to claim 2 wherein the polyethylene terephthalate film is provided in at least three plies having a thickness of at least 0.012 inch.

4. The method according to claim 1 wherein the outboard edge of the spacer is mounted about ¼ inch from the edges of the window panes.

5. A method of forming and mounting an insulated impact resistant glass into a window frame, the steps comprising:

applying a multiple ply laminated safety film to one surface of two window panes of predetermined thickness, the safety film extending to the edges of each window pane;

inserting a spacer between the window pane surfaces receiving the safety film, an inboard edge of the spacer configured to extend no further than a site line of a window frame in which the window panes are to be mounted, an outboard edge of the spacer extending no closer than ¼ inch from the edges of the window panes;

applying a structural glazing compound from the outboard edge of the spacer to the edges of the window panes;

providing the window frame with a glazing channel below the site line and applying a glazing tape to a surface of the glazing channel;

inserting the window panes with spacer into the glazing channel, the surfaces of the window pane opposite the safety film juxtaposed to the glazing tape;

installing a glazing bead; and filling any gap between the glazing bead and the window panes with a glazing compound up to the site line of the window frame.

6. The method according to claim 5 wherein about three ply of polyethylene terephthlate is provided as the safety film.

7. The method according to claim 6 wherein the polyethylene terephthlate laminated film is provided at a thickness of 0.008 to 0.020 inch.

8. The method according to claim 7 wherein the polyethylene terephthlate laminated film is provided at a thickness about 0.012 inch.

9. The method according to claim 5 wherein the spacer is provided at a thickness between the window panes of ¼ to ⁹⁄₁₆ inch.

10. The method according to claim 9 wherein the spacer is provided at a thickness between the window pane of ¼ to ½ inch.

11. The method according to claim 5 wherein the structural glazing compound applied is silicone.

12. The method according to claim 5 wherein the structural glazing compound applied is buytal.

13. The method according to claim 5 wherein the glazing tape is a silicone tape.

14. The method according to claim 5 wherein the window panes are provided ⅜ inch thick.

* * * * *